United States Patent

[11] 3,580,276

| [72] | Inventors | Christ P. Korbilas<br>Chicago;<br>Raymond W. Smith, Park Ridge, Ill. |
|---|---|---|
| [21] | Appl. No. | 793,527 |
| [22] | Filed | Jan. 23, 1969 |
| [45] | Patented | May 25, 1971 |
| [73] | Assignee | Astro Controls, Inc.<br>Chicago, Ill. |

[54] MULTIPURPOSE LIQUID TRANSFER VALVE
10 Claims, 3 Drawing Figs.

[52] U.S. Cl. .................................... 137/517,
 137/529
[51] Int. Cl. .................................... F16k 11/00,
 F11k 21/00
[50] Field of Search ........................ 251/148;
 137/543, 529, 517, 542, 543.13

[56] References Cited
UNITED STATES PATENTS

| 2,967,541 | 1/1961 | Norway et al. ............... | 137/517X |
| 3,095,899 | 7/1963 | Billington .................... | 137/517X |
| 3,438,392 | 4/1969 | Wilson ......................... | 137/517 |

Primary Examiner—M. Cary Nelson
Assistant Examiner—R. B. Rothman
Attorney—Harbaugh & Thomas ABSTRACT: A flow control three position dual spring controlled valve which snaps shut as an excess flow check valve with flow in one direction through a shutoff valve with high degree of accuracy, and, with flow in the opposite direction, accommodates maximum flow capacity permitted by the shut off valve. The flow control valve preferably is protectively disposed within a tank and is constructed to withstand without damage the hammerlike blows of valve ports rapidly propelled in their action.

Patented May 25, 1971  3,580,276
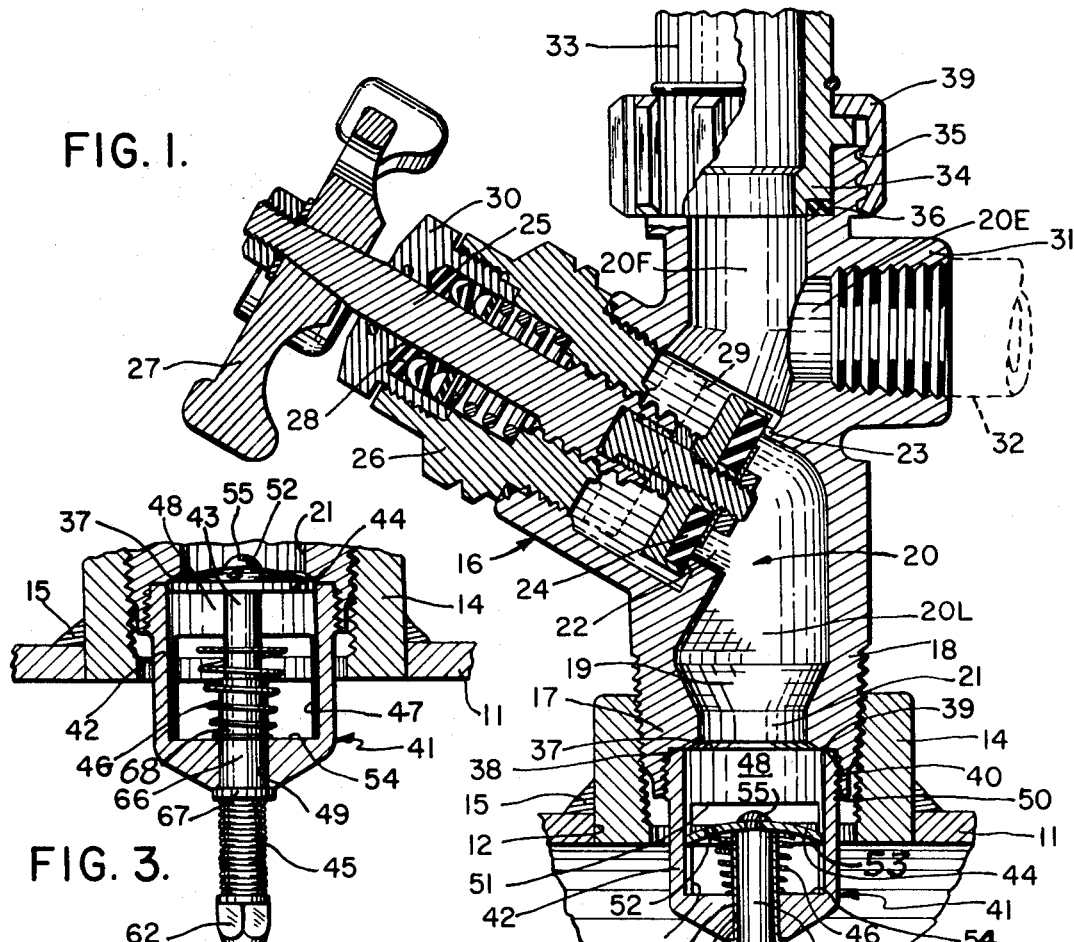
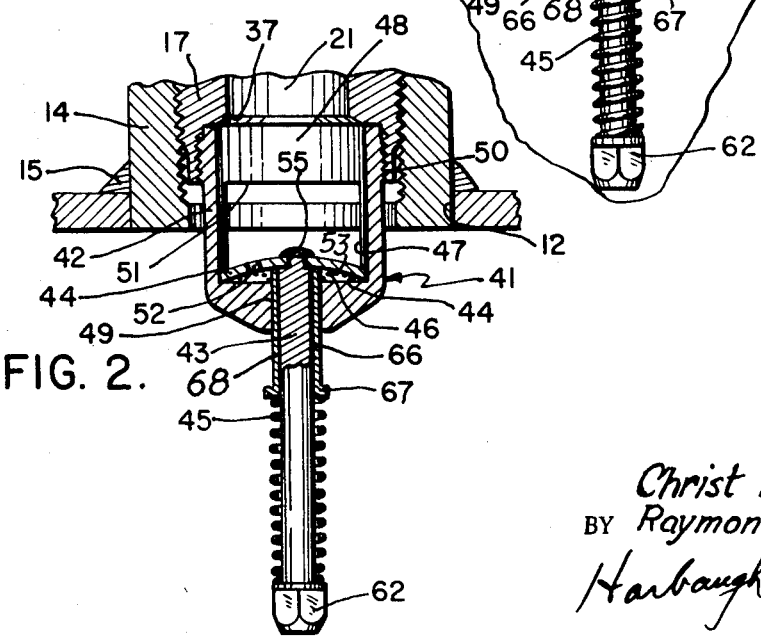
INVENTORS
Christ P. Korbilas
BY Raymond W. Smith
Harbaugh + Thomas
ATT'YS 3,580,276

MULTIPURPOSE LIQUID TRANSFER VALVE

CROSS REFERENCE

This application is an improvement upon the copending co-owned Wilson application Ser. No. 639,684 filed May 19, 1967, now U.S. Pat. No. 3,438,392.

BACKGROUND OF THE INVENTION

It is highly desirous in liquified gas systems that check valves be associated with shutoff valves that control the flow of gas from a source of liquefied gas pressure through a single tank opening or conduit so that if there is a rupture beyond the check valve, flow will be stopped until the dangerous conditions can be corrected.

Excess flow check valves have been used heretofore protectively in such systems, particularly in eduction conduits. However, in order to be operative, the valve must be normally open for service flows yet the flow opening afforded by the check valve must be substantially less than the full flow capacity of the conduit being protected, thereby requiring a two position valve for acceptable operativeness, namely, open and closed. Due to low service flow the conduit is accordingly generally smaller because larger conduits would be impractically oversized. On the other hand if the small size conduit is quite long then flow friction reduces sensitivity to excess flow conditions. Furthermore, the presence of such a two position check valve in a conduit limits the usefulness of the conduit to flow in one direction and thereby makes it necessary to provide a second and large size conduit means for flow in the opposite direction. The latter is then protected with a backflow check valve. The backflow check valve, of course, prevents use of the larger conduit as a service conduit. Moreover, there is difficulty with damage occurring from the hammerlike blows experienced with flow check valves having any increased weight factor that may be involved such as with excess flow check valves equipped for plural functions.

SUMMARY OF THE INVENTION

In the present invention a check valve construction is provided which can be mounted on the tank end of a valve body, such as a hand shutoff valve, and will provide the highest degree of accuracy and sensitivity both as an excess flow check valve for a large eduction conduit, and a backflow check valve when the conduit is used for filling operations. Thereby both eduction and filling operations can be accomplished with maximum effectiveness and safety through a single opening and shutoff valve in a liquefied gas dispensing system, and beyond the shutoff valve the conduits for different purposes can be of any appropriate size. More particularly, the invention relates to an improved combination filler and excess flow check valve arrangement which can be mounted on several types of valve bodies to utilize a valve seat that is provided preferably upon or supported by the valve body to cushion the major portion of the sharp blow effect of the movable valve parts in their operation and the remaining portion is carried remotely from the valve seat.

An object of the invention is to provide an excess flow check valve which is supported squarely to the valve seat and will close and operate consistently whether assembled with a supporting male fitting in a full coupling, half coupling, or a coupling of less length, carried by a tank that is dispensing compressed gases.

A further object of the invention is to provide an excess outflow check valve which can be used in an inflow filler conduit and provides a fully open conduit above the check valve member when depressed to clear lateral openings in the conduit.

A further object is to provide a backflow check valve that is wide open for filling operations and serves consistently at a predetermined alternate position as an excess flow check valve for dispensing operations.

The invention is further characterized by checking an excess flow with high accuracy and consistency for restricted vapor phase eduction yet accommodates full capacity flow with liquid phase filling operations.

The invention is also characterized by a bidirectional valve, construction of different flow characteristics which is simple in construction and assembly and readily adaptable for installation and use with other valves and fittings in either one of two axially disposed orientations.

These being among the objects other and further objects will be apparent from the appended claims and the description of the drawing in which:

FIG. 1 is a sectional view taken through a hand shutoff valve with dispensing and filling fittings shown diagrammatically in one plane for ease of understanding, and the preferred form of the check valve construction mounted in place thereon with the check valve shown in its normal, alert position under working conditions;

FIG. 2 is a sectional view of a portion of the arrangement shown in FIG. 1 showing the check valve in its full filling flow accommodating position; and, FIG. 3 is a sectional view similar to FIG. 2 showing the check valve in its closed eduction or outflow checking position.

In the drawing, and referring to FIG. 1, a storage tank for liquefied gas is shown at 11 having an opening 12 in the top side to receive a threaded coupling 14 therein as secured in sealed relation by a weld 15. A hand shutoff valve 16 is threaded at its base 17 into the coupling to close said opening. The coupling shown is a half coupling. Other lengths can be used.

The shutoff valve comprises a body 18 having Y-shaped passage 20 therethrough which affords a particular flow rate capacity through a restricted opening 21 preferably forming the throat of a venturi section 19 of the passage as located essentially within the protective confines of the coupling 14, which opening for purposes of later comparisons can be considered to be approximately a 15/16-inch opening. A valve opening or port 22 with a valve land 23 is shown at the upper end of the leg 20L of the passage 20 which is closed by a valve seat disc 24 controlled by a valve stem 25 threaded in a bonnet 26 for movement from its closed position, shown in full lines, to its open position shown in broken lines 29. A handle 27 rotates the valve stem and a chevron packing 28 retained by a gland nut 30 seals it.

On the valve side of the port 22 the passage 20 bifurcates into an eduction passage 20E through a threaded boss 31 receiving a service line 32 which receives in its outlet either a weather closure (not shown) or a filler line 33 with a nozzle 34 held in place by a coupling 39 secured by Acme threads 35 and sealed by a compression washer 36. Whenever the valve 24 is open, fluid can flow in either direction through the valve port 22 from the filler passage 20F into the tank, or from the tank out through the service line 32, or both during the brief filling operation if both occur together, it being appreciated that an excess flow check valve will close if a rupture occurs in the filling line or if outflow from the tank is excessive.

The lower end of the shutoff valve is counterbored at 39 to provide an integral valve seat 37 and shoulder 38, which requires no internal seals. The counterbore wall is threaded at 40 to receive in supported relation the excess flow check valve assembly 41 which includes a cup-shaped retainer body 42 having lateral openings 47 and an axial bore 49. A spacer sleeve 66 has a cylindrical portion 68 that is slidably mounted in the axial bore 49 and has a radial flange portion 67 that limits its upward movement. A stem 43 is axially reciprocable in the sleeve and is held at one limit of its movement by spring 45 as disposed between the flange portion 67 and a hex head 62 on its lower end. The stem 43 carries the check valve disc 44 welded to the upper end as at 55 and is normally held by the spring 45 and stem 43 at an intermediate resting or poised position with the disc 44 resting at the upper end of the sleeve. The spring 45 yields to movement of the disc and stem together in an upward direction under excess fluid eduction flow and a second spring 46 engages the disc in its resting position but is yieldable to permit movement of the disc on the stem in the downward direction under fluid filling flow. The openings 47 are formed by milling off the bottom and opposite sides of the cup in a chordal fashion to a depth that is approximately two-thirds of the radius of the cup whereby the openings open axially as well as laterally.

More particularly, the retainer body has a cylindrical portion 48 at the top thereof externally threaded at 50 to engage threads 40 with the lip edge engaging the shoulder 38. The upper edge 51 of the openings 47 are located low enough to clear the lower end of the base 17 with the inside diameter of the cylindrical portion larger than the diameter of the valve seat 37 to provide sliding clearance adequate for the disc 44 to engage and close against the valve seat with an upward movement. When closed a bleed opening 52 through the disc gradually balances pressures on both sides.

The valve disc 44 has a spherical contour providing a concave recess 53 on its lower face that cooperates with the bottom wall 54 of the retainer body 42 to provide a cavity accommodating the conical spring 46 when fully compressed upon downward movement of the valve disc induced by incoming fluid so that the edge of the valve disc preferably contacts the interior bottom of the retainer body. Thus, the valve disc, stem and sleeve are slidable during filling operations to the fully open position with the conduit portion above the valve completely clear of all valve parts for full flow. The spring 45 will yield upon upward movement of the disc and stem under excess fluid eduction flow as shown in FIG. 3 where the disc is closed against the valve seat 37.

When the valve closes, it can close from the wide open position shown in FIG. 3 or the poised position shown in FIG. 1. It is very seldom that the closing is from the filling position shown in FIG. 3 unless the filler hose associated with the nipple 34 burst or was badly cut. Most of the closings occur from the position shown in FIG. 1.

Under excess flow conditions the valve closes in both instances with a snap action propelling the shaft 43 and any parts carried by it with a force creating a hammerlike blow upon any element which serves as a stop.

The force of the stem and valve closing from either position is distributed over the wide area of the valve seat of the main valve body which is generally made of brass and the valve disc 44 of steel. In those instances where closing is from a full wide open position, the potential of the blow is the greatest but such is divided and taken at two places. The force of the sleeve and spring is carried by the flange 67 against the bottom of the retainer body 42.

With this arrangement the retainer body can be made of an easily machined metal such as aluminum, the valve stem 43 of mild steel rod stock, the sleeve 66 of cylindrical tubing cut off and flared at one end to provide the flange 67, and the disc of stamped sheet steel. Although it will be appreciated that disc 44 can be threaded or swaged onto the upper end of the rod 43, it is preferred to integrate it in place by flame or arc welding. A wide range of spring rates can be selected for the spring 45 for different installations and different flow rates. The conical spring need only carry the weight of the valve 44, stem 43, sleeve 66 and spring 45 and therefore can be standardized for inventory and not only is light but provides for a universal orientation of the valve.

By way of example, but without limitation, relative proportions can be better understood with a valve having a disc 44 diameter of 1 inch which provides an area of 0.785 sq. in. The opening area of the valve port 21 is 0.688 sq. in.; the area of the lower opening of the coupling 14 is 1.76 sq. in.; and, the flow area through the openings 47 above the disc 44 in its resting position is 0.6125 sq. in. Thus, with a pressure exerted over a 0.785 sq. in. disc valve area and a flow through a 0.6125 sq. in. area into a 0.785 + sq. in. valve chamber for flow through a 0.685 sq. in. port area, these being constant in any installation, it only remains to determine the pressure drop across the valve disc which would be considered to be critical or unsafe and then select the spring 45 whose rate would yield at that pressure. Then, once the valve starts to close, the critical area (0.6125 sq. in.) is lessened and the pressure differential quickly increases to overcome the spring completely and snap the valve to its closed position. Pressure differentials in the range of 12 to 13 p.s.i. are generally provided for, and with the present invention the performance of the valve will be consistent for all installations since the full areas on both sides of the valve are fully exposed to gas flowing conditions. This is true even if the valve was received in a conduit only one-third again larger in diameter than the diameter of the valve disc.

In the above example the spacing of the valve disc from its lowermost position not only allows the valve disc to close consistently whether assembled in a full coupling, a half coupling or less, but this spacing goes to zero in filling operations to provide maximum filling flow of liquid or gas.

Having thus described a preferred embodiment of the invention, the relationship and operation of the parts, it will be readily understood how the objects of the invention are attained and how further modifications may be provided including making the valve seat integral with the retainer body and varying the radial depth of the chordal cuts made in the retainer body to provide the windows as well as varying the height of the valve disc in the lateral openings, without departing from the spirit of the invention.

We claim:

1. A multiple purpose flow control valve for fluids under pressure comprising a cup-shaped retainer body having lateral access fluid flow openings through the lower portion of the sidewall thereof and an axial bore through the bottom wall thereof, valve seat means proximate to the upper edge of the sidewall and facing towards said bottom wall for fluid flow therethrough under pressure, sleeve means slidably mounted in said axial bore having a flange means adjacent to its lower end limiting its movement towards said valve seat means, valve stem means mounted in said sleeve, stop means carried by said stem means a predetermined distance below the flange means, valve disc means carried by said stem means for movement between said valve seat and said bottom wall during filling operations, first spring means carried by the stem means between said flange means and said stop means to urge the valve disc to engage the upper end of said sleeve means and yielding with movement of the stop means and valve disc means towards said valve seat to close the valve port under excess flow conditions, and second spring means urging said disc means towards said valve seat means and said flange means against said retainer body and yielding during filling operations.

2. The combination called for in claim 1 in which said lateral openings extend chordally through the bottom wall, said stem and valve disc being coterminus and adjacent to the bottom wall in their lowermost position, and said second spring means being disposed between said bottom wall and said valve disc.

3. The combination called for in claim 1 in which said valve disc means on said stem means engages the upper end of the sleeve when said stop means is disposed in a position with respect to said bottom wall, said second spring means being disposed between said disc means and the inside face of the bottom wall.

4. A multiple purpose flow control valve means for fluids under pressure comprising a valve body with a passage therethrough, a cup-shaped retainer body having a lateral access fluid flow opening through the wall thereof and an axial bore in the bottom wall thereof, valve seat means between said bodies facing said axial bore, sleeve means slidably mounted in said axial bore, valve stem means reciprocably mounted in axially guided relation in said sleeve means, valve disc means secured to one end of said valve stem means within said retainer for axial movement therewith as a unit into engagement with said seat means and away from said seat means across said fluid flow opening to a wide opening position adjacent to said bottom wall, excess flow spring means carried by said stem to urge said disc means into contact with said sleeve means, resilient means urging said valve disc means and stem means a substantial distance towards said valve seat, permitted by said sleeve means, stop means between said excess flow spring means and said sleeve means for engaging said bottom wall to limit movement of the excess flow spring means in a direction towards the valve seat means and locate the point of said contact between the valve disc means and sleeve means in a valve disc resting position a predetermined spaced distance from said valve seat.

5. The combination called for in claim 4 in which the flow area through said flow opening above said valve disc in said resting position is substantially less than the valve port area, and the full flow area of the flow opening above the disc in its wide open position it wide open and greater than the valve port area.

6. The combination called for in claim 4 in which the fluid flow opening extends axially through the bottom wall to expose the bottom of said valve disc to fluid flowing therethrough in the direction urging the valve disc to its closed position, said valve disc having a recess on its lower face accommodating said resilient means in its fully open position and receiving the upper end of the sleeve means therein.

7. A multiple purpose flow control valve for fluids under pressure comprising a coupling and a valve body having an externally threaded mounting boss received in said coupling and with a passage therethrough terminating in a valve seat defining a valve port within the boss, a cup-shaped retainer means supported on the boss proximate to the valve seat and having lateral access fluid flow openings through the wall thereof below said boss and an axial bore in the bottom wall thereof, sleeve means slidably mounted in said axial bore, a valve disc disposed within the retainer for axial movement across said fluid flow openings, stem means received in said bore in guided relationship and secured to the valve disc as a unit therewith to move the valve disc between a closed position against said valve seat and a fully open position away from said valve seat, stop means on the sleeve means for engaging said bottom wall to locate the valve disc at an intermediate poised position spaced a predetermined distance from the valve seat, spring means urging said valve disc and sleeve means towards each other and said stop means towards said valve seat to dispose said stop means in said valve disc poised position and yielding with movement of the valve disc towards said valve seat to close said valve port under excess flow conditions, and resilient means urging said disc, sleeve means and stop means towards the valve seat to hold said valve in said poised position and yield to movement of the disc away from said valve seat to a fully open position under filling conditions.

8. The combination called for in claim 7 in which the valve disc and upper limit of said stem means are disposed a substantial distance below the adjacent end of said coupling in its fully open position and out of the path of flow of liquid.

9. The combination called for in claim 7 in which said lateral openings extend axially through the bottom wall exposing the lower face of the valve disc at all times to axial flow of fluid past said valve disc towards said valve seat.

10. The combination called for in claim 7 in which said valve disc is concave on its lower side to accommodate said resilient means when in fully open position and has a bleed means through it to equalize pressures on opposite sides thereof when in its closed position.